Patented June 14, 1938

2,120,811

UNITED STATES PATENT OFFICE 2,120,811

METHOD FOR THE PREPARATION OF COMPOUNDS OF THE BENZIDINE SERIES

George H. Richards, Buffalo, N. Y., assignor to National Aniline and Chemical Company, Inc., New York, N. Y., a corporation of New York No Drawing. Application March 27, 1935, Serial No. 13,281

6 Claims. (Cl. 260—130.5)

This invention relates to improvements in the preparation of compounds of the benzidine type. It more particularly relates to improvements in the process of preparing such compounds from aromatic hydrazo compounds, by the mechanism known as rearrangement.

It is well known that aromatic hydrazo compounds, that is, N,N'-diarylhydrazines, under the influence of acidic catalyzing agents, such as hydrochloric or sulfuric acid, undergo rearrangement to form salts of the corresponding benzidine compounds.

The methods which have heretofore been utilized for carrying out this rearrangement, however, suffer from disadvantages which, up to the present time, have not been surmounted by either chemical or physical means. The use of hydrochloric acid alone, for example, while yielding efficient conversion, results in the formation of a soluble hydrochloride of the benzidine compound which is often difficult to recover in the solid state without undue loss in yield. Hydrochloric acid furthermore is a relatively expensive reagent and its use in large quantities materially increases the cost of the process and product. The use of sulfuric acid, on the other hand, is much less expensive and yields insoluble salts of the benzidine compounds. However, difficulties arise in this case also, since the insoluble product in precipitating tends to occlude relatively large amounts of the unreacted hydrazo compound, thus yielding an impure product. Attempts have been made to avoid the above difficulties by the use of a two-step process wherein the hydrazo compounds are converted to the soluble hydrochlorides by means of hydrochloric acid and then the hydrochlorides are converted to the insoluble sulfates by means of sulfuric acid and/or sodium sulfate. This process, while fairly satisfactory, is rather too expensive for industrial purposes.

It has now been found that effective conversion of aromatic hydrazo compounds to the corresponding benzidine compounds may be accomplished, and the disadvantages of the prior methods avoided by the use, in the novel manner to be hereinafter more fully described, of an acid, preferably hydrochloric acid, which is capable of causing rearrangement of the hydrazo compound to form a soluble salt of the corresponding benzidine compound, in conjunction with a compound, preferably sulfuric acid, which is capable of regenerating the acid used to bring about the rearrangement and of forming an insoluble salt with the benzidine compound.

In accordance with this invention, the appropriate hydrazo compound may be treated with an amount of hydrochloric acid sufficient to cause the rearrangement of only part of the hydrazo compound, for instance about one-fifth to one-half, more or less, thereof, to the soluble hydrochloride of the corresponding benzidine compound. To the solution or slurry which is thereby formed, and which contains the hydrochloride of the benzidine compound together with unreacted hydrazo compound, there is then added sufficient sulfuric acid to react with the hydrochloride to liberate the hydrochloric acid and to form an insoluble sulfate with the benzidine compound. The liberated hydrochloric acid immediately causes the rearrangement of more of the hydrazo compound to the hydrochloride of the benzidine compound whereupon more sulfuric acid may be added and the cycle repeated until all the hydrazo compound has been converted to the insoluble sulfate. In order to avoid the presence of any excess of sulfuric acid in the reaction mixture, the addition of sulfuric acid, which may be either intermittent or continuous, should be so regulated that there is no substantial amount of sulfuric acid present for conversion of hydrazo compound directly to the sulfate of the benzidine compound. This condition may be maintained by keeping the additions of sulfuric acid just below the amount required for conversion of the hydrochloride of the benzidine compound to the sulfate of the benzidine compound so that at least a small quantity of the hydrochloride of the benzidine compound is present during most of the reaction period and preferably throughout the entire period. By so carrying out the reaction the sulfuric acid is removed from the field of action almost immediately after it is added, due to the insolubility of the sulfates of the benzidine compounds, thus forestalling any rearrangement of the hydrazo compound by the sulfuric acid, which rearrangement, as intimated above, tends to cause formation of an impervious shell of the sulfate of the benzidine compound around particles of the unreacted hydrazo compound, with consequent degradation in the quality of the yield.

If desired, at the completion of the rearrangement the final conversion of the remaining soluble hydrochloride to the insoluble sulfate may be accomplished by adding to the reaction mixture sodium sulfate or any other soluble sulfate which will form a salt with the liberated hydrochloric acid while forming the insoluble sulfate of the benzidine compound. The proportion of hydrochloric acid present at the end of the reaction is much lower than in former processes and the effect of the acid or of chlorides upon the solubility of the sulfates is correspondingly diminished.

An example of the process of this invention is hereinbelow given, it being fully understood that it is not intended to limit the scope of the invention thereto.

*Example.*—About 600 parts by weight of crude hydrazo benzene containing about 450 parts by weight of the pure compound were added with agitation to about 3000 parts by weight of an aqueous solution containing about 116 parts by weight of hydrogen chloride. To the resulting slurry there were added with constant agitation about 181 parts by weight of about 79 per cent sulfuric acid in accordance with the following schedule, the temperature of the reaction mixture being maintained throughout the reaction at about 25° C. to about 30° C.

| Elapsed time after addition of hydrazobenzene to hydrochloric acid solution | Parts by weight of sulfuric acid added |
|---|---|
| *Hours* | *Parts* |
| About 2.5 | About 87. |
| About 4.5 | About 58. |
| About 6.5 | About 22. |
| About 12 | About 14. |

By carrying out the reaction in this manner, the sulfuric acid is converted to benzidine sulfate substantially as soon as it is added to the reaction mixture.

After the addition of sulfuric acid was completed, the mass was agitated for about 8 hours and then heated to about 70° C. at which temperature stirring was maintained for about one hour. At the end of this time about 95 parts by weight of anhydrous sodium sulfate were added, and the solution stirred to permit complete dissolution thereof. The precipitated benzidine sulfate was then separated by filtration and washed with water to remove any traces of acid or excess soluble sulfate. The yield of benzidine sulfate corresponded to about 394 grams of benzidine base or about 88 per cent of the theoretical yield.

In the above example, the resulting benzidine sulfate is considerably denser and much more compact than that obtained by carrying out the complete rearrangement with hydrochloric acid alone in the absence of sulfates and at the completion of the conversion precipitating benzidine sulfate therefrom by the addition thereto of a sulfate. Further, the rearrangement is carried out at a greater concentration than ordinarily employed when hydrochloric acid alone is used.

The invention is not restricted to the use of the reagents indicated in the example; for instance, in place of hydrochloric acid, any acid may be used which causes the rearrangement of hydrazo compounds and forms a soluble salt with the resulting benzidine compound, and in place of the sulfuric acid, phosphoric acid or any other acid which is capable of displacing the rearranging acid from the salts of the benzidine compounds and forming an insoluble salt with the benzidine compound may be used.

The invention furthermore is applicable to the preparation of dianisidine from hydrazoanisole, tolidine from hydrazotoluene, etc.

The benzidine compounds prepared in accordance with this invention are fully equal in quality to those prepared by the use of hydrochloric acid alone and much superior to those prepared using sulfuric acid alone and the yields are high and the cost of production relatively low.

I claim:

1. In the preparation of a benzidine compound by rearrangement of a hydrazo compound, the improvement which comprises subjecting the hydrazo compound to the action of aqueous hydrochloric acid solution in amount only sufficient to convert between about ⅕ and about ½ of the hydrazo compound to the corresponding benzidine hydrochloride, whereby there is formed a mixture of the hydrazo compound with an aqueous solution of the corresponding benzidine hydrochloride, gradually adding an acid of the group consisting of sulfuric acid and phosphoric acid to said mixture to convert the benzidine hydrochloride to the corresponding sulfate or phosphate, and regulating the addition of the sulfuric or phosphoric acid so that the reaction mixture contains throughout practically the entire reaction period sufficient of the benzidine hydrochloride to react with all the sulfuric or phosphoric acid present.

2. In the preparation of benzidine by rearrangement of hydrazo-benzene with hydrochloric acid, the improvement which comprises subjecting the hydrazo-benzene to the action of aqueous hydrochloric acid solution in amount only sufficient to convert between about ⅕ and about ½ of the hydrazo-benzene to benzidine hydrochloride so as to form a mixture of hydrazobenzene with aqueous benzidine hydrochloride solution, and adding to said mixture sulfuric acid at a regulated rate such that the amount of free sulfuric acid present at any time during the reaction does not materially exceed the chemical equivalent of benzidine hydrochloride present.

3. In the preparation of dianisidine by rearrangement of hydrazo-anisole with hydrochloric acid, the improvement which comprises subjecting the hydrazo-anisole to the action of aqueous hydrochloric acid solution in amount only sufficient to convert between about ⅕ and about ½ of the hydrazo-anisole to dianisidine hydrochloride so as to form a mixture of hydrazo-anisole with dianisidine hydrochloride solution, and adding to said mixture sulfuric acid at a regulated rate such that the amount of free sulfuric acid present at any time during the reaction does not materially exceed the chemical equivalent of dianisidine hydrochloride present.

4. In the preparation of tolidine by rearrangement of hydrazo-toluene with hydrochloric acid, the improvement which comprises subjecting the hydrazo-toluene to the action of aqueous hydrochloric acid solution in amount only sufficient to convert between about ⅕ and about ½ of the hydrazo-toluene to tolidine hydrochloride so as to form a mixture of hydrazo-toluene with aqueous tolidine hydrochloride solution, and adding to said mixture sulfuric acid at a regulated rate such that the amount of free sulfuric acid present at any time during the reaction does not materially exceed the chemical equivalent of tolidine hydrochloride present.

5. In a method for the preparation of a salt of a benzidine compound involving rearrangement of a hydrazo compound wherein said hydrazo compound in an inert liquid medium is reacted with an acid adapted to convert said hydrazo compound to a benzidine salt soluble in said inert liquid medium, the improvement which comprises reacting said hydrazo compound in said inert liquid medium with an amount of said acid only sufficient to convert a part of the entire amount of said hydrazo compound to said benzidine salt, thereby producing a slurry composed of said hydrazo compound and a solution of said benzidine salt in the inert liquid medium, and adding to the slurry an acid capable of reacting with said benzidine salt to form a benzidine salt insoluble in said inert liquid medium whereby the soluble benzidine salt is converted to insoluble benzidine salt and the first-mentioned acid is regenerated and converts further quantities of the hydrazo compound to the corresponding benzidine salt, and regulating the addition of said last-mentioned acid so that the reaction mixture contains throughout practically the entire reaction period sufficient of said soluble benzidine salt to react with all of said last-mentioned acid present.

6. In a method for the preparation of a salt of a benzidine compound involving rearrangement of a hydrazo compound wherein said hydrazo compound in an aqueous medium is reacted with hydrochloric acid to convert said hydrazo compound to a hydrochloride of the corresponding benzidine compound, the improvement which comprises reacting said hydrazo compound in said aqueous medium with an amount of hydrochloric acid only sufficient to convert a part of the entire amount of said hydrazo compound to said hydrochloride, thereby producing a slurry composed of said hydrazo compound and an aqueous solution of said hydrochloride, adding to the slurry an acid of the group consisting of sulfuric acid and phosphoric acid to form the benzidine salt thereof and to regenerate hydrochloric acid, which upon regeneration converts further quantities of said hydrazo compound to the corresponding benzidine hydrochloride, and regulating the addition of the acid of said group so that the reaction mixture contains throughout practically the entire reaction period sufficient of said hydrochloride to react with all of the last-mentioned acid.

GEORGE H. RICHARDS.